(12) United States Patent
Papasavva et al.

(10) Patent No.: US 11,664,514 B2
(45) Date of Patent: May 30, 2023

(54) FUEL CELL VOLTAGE RESPONSE BY CONTROLLING AIR FLOW ON CATHODES

(71) Applicant: Ford Global Technologies, LLC, Dearborn, MI (US)

(72) Inventors: Stella Papasavva, Royal Oak, MI (US); Valentina Mejia Mejia, Royal Oak, MI (US); Zeng Qiu, Grosse Pointe Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 233 days.

(21) Appl. No.: 17/217,544

(22) Filed: Mar. 30, 2021

(65) Prior Publication Data

US 2022/0320544 A1    Oct. 6, 2022

(51) Int. Cl.

| | | |
|---|---|---|
| *H01M 8/04746* | (2016.01) | |
| *H01M 8/04302* | (2016.01) | |
| *H01M 8/04225* | (2016.01) | |
| *H01M 8/04089* | (2016.01) | |
| *H01M 8/04992* | (2016.01) | |
| *B60L 50/72* | (2019.01) | |
| *B60L 58/31* | (2019.01) | |
| *H01M 8/04082* | (2016.01) | |
| *B60L 50/75* | (2019.01) | |

(52) U.S. Cl.
CPC ......... *H01M 8/04753* (2013.01); *B60L 50/72* (2019.02); *B60L 58/31* (2019.02); *H01M 8/04089* (2013.01); *H01M 8/04201* (2013.01); *H01M 8/04225* (2016.02); *H01M 8/04302* (2016.02); *H01M 8/04992* (2013.01); *B60L 50/75* (2019.02); *H01M 2250/20* (2013.01)

(58) Field of Classification Search
CPC ................................. B60L 50/72; B60L 58/31
See application file for complete search history.

(56) References Cited

U.S. PATENT DOCUMENTS

| | | | |
|---|---|---|---|
| 9,614,236 B2 | 4/2017 | Yu et al. | |
| 2005/0112454 A1* | 5/2005 | Gurin | H01M 8/04089 429/516 |
| 2007/0048557 A1* | 3/2007 | Sinha | H01M 8/04753 429/513 |
| 2009/0123787 A1 | 5/2009 | Shimoi et al. | |
| 2013/0323616 A1 | 12/2013 | Fellows | |
| 2014/0203636 A1* | 7/2014 | Goetz | B60L 7/10 307/10.1 |

* cited by examiner

*Primary Examiner* — Adam A Arciero
(74) *Attorney, Agent, or Firm* — David B. Kelley; Brooks Kushman P.C.

(57) ABSTRACT

An automotive fuel cell stack includes anodes and cathodes, and a controller that, after receiving data indicating that load current demand is within a first pre-determined range, modulates a flow rate of air to the cathodes between zero and a pre-determined value until a cell output voltage achieves a value falling within a second pre-determined range greater than zero.

18 Claims, 3 Drawing Sheets

FUEL CELL VOLTAGE RESPONSE BY CONTROLLING AIR FLOW ON CATHODES

TECHNICAL FIELD

The present disclosure relates to automotive fuel cell control strategies.

BACKGROUND

The hydrogen fuel cell, and in particular the proton exchange membrane fuel cell (PEMFC), is one potential power source for automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a carbon fiber based gas diffusion backing layer, is used to transport reactant gases and electrons as well as remove product water and heat. In addition, a flow field plate is generally used to distribute the reactant gases.

SUMMARY

A vehicle includes a fuel cell stack arranged to generate power for propelling the vehicle, and a controller. The controller, upon activation of the vehicle, pulses delivery of air to cathodes of the fuel cell stack such that a flow rate of air to the cathodes alternates between zero and a pre-determined value until a cell output voltage achieves a value falling within a pre-determined range, and after the cell output voltage achieves the value falling within the pre-determined range, continually delivers air to the cathodes at a non-zero rate.

An automotive fuel cell stack includes anodes and cathodes, and a controller. The controller, after receiving data indicating that load current demand is within a first pre-determined range, modulates a flow rate of air to the cathodes between zero and a pre-determined value until a cell output voltage achieves a value falling within a second pre-determined range greater than zero.

A method for a vehicle, having a fuel cell stack for power generation, includes after deactivating the vehicle, modulating between zero and a pre-determined value a flow rate of air to cathodes of the fuel cell stack until cell output voltage of the fuel cell stack achieves a value falling within a pre-determined range.

DETAILED DESCRIPTION

The disclosed embodiments are merely examples and other embodiments can take various and alternative forms. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural references unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Figure 1:
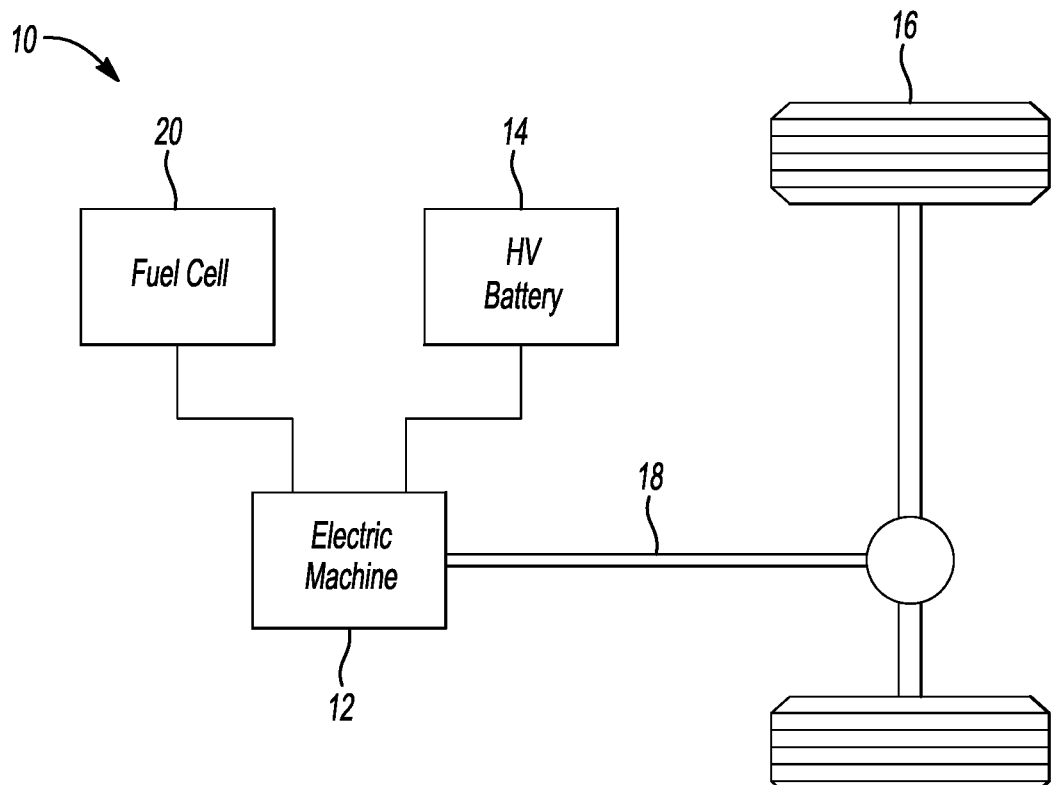
FIG. 1 is a schematic diagram of a fuel cell vehicle.

Referring to FIG. 1, a vehicle 10 includes a fuel cell stack 20 for providing electrical power to at least one electric machine 12. The vehicle 10 may also include a traction battery 14 electrically connected to the fuel cell stack 20 and the electric machine 12. The electric machine 12 is connected to the drive wheels 16 via a drivetrain 18. During operation of the vehicle 10, hydrogen fuel and air are fed into the fuel cell stack 20 creating electrical power. The electric machine 12 receives the electrical power as an input, and outputs torque for driving the wheels 16 to propel the vehicle 10.

Proton Exchange Membrane Fuel Cells (PEMFC) are a popular fuel cell choice for automotive vehicles. The PEMFC generally includes a proton exchange membrane (PEM), a cathode and, an anode. The anode and the cathode typically include finely divided catalytic particles, usually platinum and/or platinum alloy, supported on carbon particles and mixed with an ionomer. The catalytic mixture is deposited on opposing sides of the membrane. The combination of the anode catalytic mixture, the cathode catalytic mixture, and the PEM define a membrane electrode assembly (MEA). In order to facilitate the transport of reactant gases to and remove the excessive water and heat from the catalytic mixture, a gas diffusion layer (GDL), which may include a microporous layer and a carbon fiber based gas diffusion backing layer, is applied on either side of the MEA. GDLs also provide mechanical support for the soft goods including the PEM and catalytic mixtures.

MEAs are sandwiched between bipolar plates to form individual fuel cells. Current collectors and compression plates may also be added on either side of the fuel cell. The bipolar plates typically include an anode side and a cathode side. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. Coolant channels may be disposed between the anode and cathode sides of the bipolar plates to provide heat transfer functionality to the fuel cell.

Several fuel cells are typically combined in a fuel cell stack to generate the desired power. For example, the stack may include 200 or more fuel cells arranged in series. The fuel cell stack receives a cathode reacting gas, typically a flow of air forced through the stack by a compressor. Not all the oxygen is consumed by the stack and some of the air exits the cathode as exhaust gas that may include water as a stack byproduct. The fuel cell stack also receives an anode hydrogen reacting gas that flows into the anode side of the stack. Gases are diffused by the GDL on either side of the MEA. Contacting the catalytic particles, typically platinum particles supported on carbon particles, hydrogen (dihydrogen) splits into protons $H^+$ and electrons $e^-$. Electrons, unable to pass through the MEA, travel along an external load circuit to the cathode side of the MEA creating the current output of the fuel cell. In doing so, electrons may travel through the GDL, the bipolar plates, the current collectors, and/or compression plates. Protons $H^+$ pass through the MEA to the cathode side.

At the cathode side of the MEA, electrons combine with oxygen (dioxygen) in the presence of catalytic particles to form $O^{2-}$. Protons $H^+$ react with ions $O^{2-}$ to form water and heat. Water is then typically transported out of the fuel cell with air flow. To accommodate the above-mentioned electrochemical reaction, a fuel system, on the anode side, may comprise a hydrogen reservoir, a regulator, a pressure control value, and/or a recirculation apparatus. On the cathode side, the fuel system may comprise an oxygen reservoir, typically an air blower or compressor, and/or a (de)humidifier. The fuel system may further comprise a heat and water management system.

During start-up, stop or stop-start modes, and shut-down events of PEMVs, the electrical circuit of the fuel cell could be open (open circuit voltage or OCV) without drawing current if system mitigations are not taken to maintain low cell voltages. OCV events without mitigation strategies can take place either a) at the initial start-up of the fuel cell vehicle (key-on) when the stack is at ambient temperatures, b) at cooling periods of the fuel cell stack from prior operation (stop mode or stop-start mode), or c) at the end of the vehicle operation (key-off) for short periods of time (typically a few seconds). Stop mode or stop-start are driving events during the operation of fuel cell vehicles that take place at idle or other low power events, that may last from a few seconds to several minutes.

During OCV operating events, hydrogen flow in the anode may be minimized while air may still be diffusing from the cathode to the anode through the electrolyte membrane. Minimizing hydrogen flow, with air still diffusing through the electrolyte membrane could result in hydrogen starvation of the fuel cell. Under hydrogen starved conditions, subsequent flow of hydrogen fuel may result in catalyst and catalyst carbon support degradation due to carbon support corrosion and oxidation. Such phenomena, under higher than ambient temperatures, like the stop or stop-start mode when the stack is at hot temperatures (80° C.-90° C.) may lead to the performance degradation of fuel cells. Accordingly, cost-effective procedures are needed that reduce performance degradation to the fuel cells.

The present disclosure relates to operation of a fuel cell during OCV events. Intelligent control mechanisms may be used to control the presence of air on the cathode in order to avoid carbon corrosion. These control mechanisms may be configured to speed up or slow down compressors/blowers (pumps) and/or open and/or close valves that control the air flow to the cathode. For example, the control unit can request the cathode valves to stop supplying air to the cathode or to supply air in such low amounts that prevent the fuel cell from reaching unacceptable voltage levels. In other circumstances, the control unit may require a small amount of load that prevents voltage from reaching OCV status.

In some OCV mitigation events, a surplus of hydrogen is available in the anode and air flow is minimized. Under this mitigation condition, hydrogen may diffuse from anode to cathode and consume the remaining oxygen, suppressing the voltage. By flowing hydrogen first to the anode and carefully metering oxygen flow into the cathode, voltage rise may be controlled below 0.85V by applying current before full delivery of air to the cathode. This mitigation strategy may be particularly useful in vehicles operated with battery-fuel cell systems. Battery-fuel cell systems require controls for the bidirectional DC/DC power flow operations. During stop events, the battery could still operate at peak voltage (>300V) while the fuel cell stack is at zero volt. The DC/DC requires a non-zero input voltage to maintain control of the HV bus, therefore precise metering of the cathode air flow to create an air starved state is required.

Figure 2:
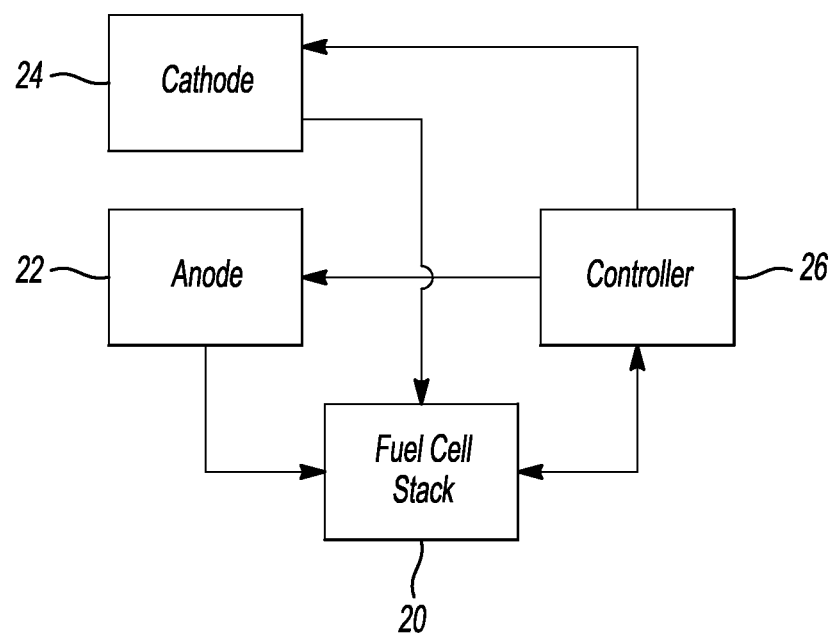
FIG. 2 shows a controller in communication with a fuel cell stack, an anode gas reservoir, and a cathode gas reservoir.

Referring to FIG. 2, a fuel cell stack 20 is shown. The fuel cell stack 20 may be coupled to an anode gas reservoir 22 and a cathode gas reservoir 24. In some embodiments, the anode gas reservoir 22 is a hydrogen tank and the cathode gas reservoir 24 is one or more of oxygen tanks, a compressor, an air blower, and/or a (de)humidifier. A controller 26 may also be arranged to communicate with the fuel cell stack 20, the anode gas reservoir 22, and the cathode gas reservoir 24. During different start-up, stop or stop-start modes, and shut-down events of the fuel cell stack 20, the controller 26 may measure the voltage output of the fuel cell stack 20 and depending on the nature of the OCV event at hand, pulse delivery of air to the fuel cell stack 20 to maintain a fuel cell output voltage within a pre-determined range.

In some embodiments, an intelligent control mechanism may be used to control and reduce carbon corrosion at the initial start-up of a fuel cell vehicle (key-on) when the stack is at ambient temperature. A vehicle comprising a fuel cell stack arranged to generate power for propelling the vehicle is provided. The vehicle may further include a controller programmed to, upon activation of the vehicle, pulse delivery of air to cathodes of the fuel cell stack such that a flow rate of air to cathodes alternates between zero and a pre-determined value until a cell output voltage achieves a value falling within a pre-determined range, and after the cell output voltage achieves the value falling within the pre-determined range, continually deliver air to the cathodes at a non-zero rate. In some embodiments, a ceiling value of the pre-determined range of the cell output voltage may be 0.85 volts or less per cell.

In some embodiments, the controller may further be programmed to begin delivering anode gas to the fuel cell stack before the pulse delivery of air. The anode gas may be hydrogen gas. In some embodiments, the flow rate of air to the cathodes may alternate between zero flow and a maximum flow set value that is a function of the size of the fuel cell system in consideration. Modulating the flow rate of air to the cathodes may be achieved by speeding up or slowing down (actuating) one or more compressors/blowers (pumps) and/or opening and/or closing valves. In some embodiments, the flow rate of air to the cathodes between zero and a pre-determined value may continue until the controller receives a sensed input (data) indicating an electrical current load demand exceeding the pre-determined range. Depending on design requirements, the cell voltage range may be set to an acceptable maximum voltage threshold which would minimize performance degradation.

Figure 3:
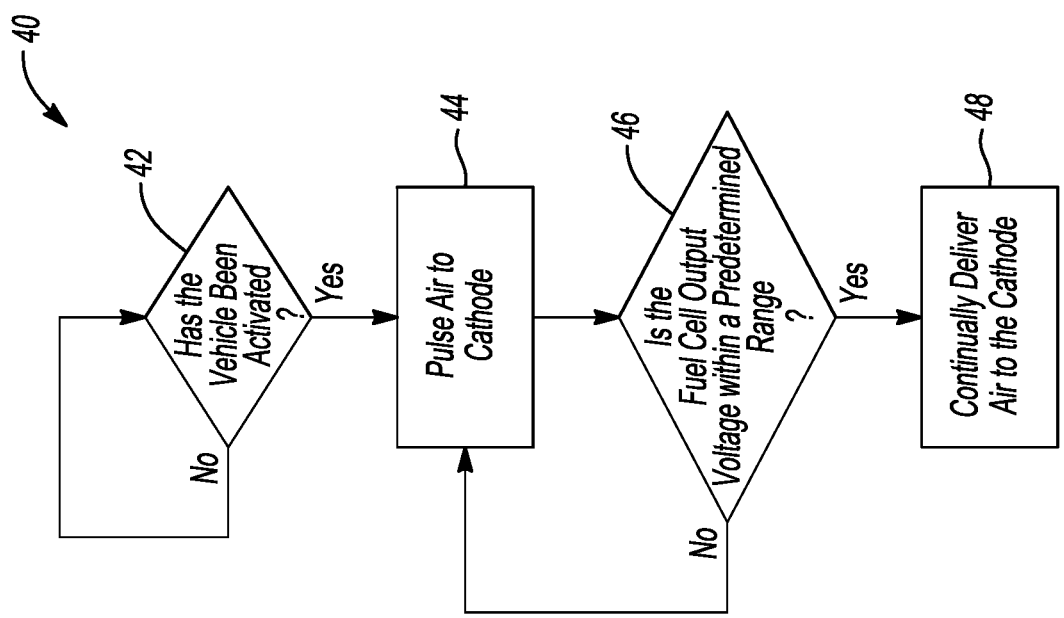
FIG. 3 demonstrates a flow chart of a control mechanism that may be used to control and reduce carbon corrosion at the initial start-up of a fuel cell vehicle when the fuel cell stack is at ambient temperature.

FIG. 3 demonstrates a flow chart of an intelligent control mechanism 40 which may be used to control and reduce carbon corrosion at the initial start-up of a fuel cell vehicle (key-on) when the stack is at ambient temperature. During a first step 42, a controller determines whether a vehicle has been activated. If the vehicle has been activated, the controller sends a signal during a second step 44 to cathodes to speed up or slow down one or more compressors/blowers (pumps) and/or open and/or close valves thereby modulating the air flow to the fuel cell stack. If the cell output voltage is within a pre-determined range, during a third step 46, the controller proceeds to continually deliver air to the fuel cell stack 48. If the cell output voltage is not within a pre-determined range, the second step 44 may be repeated.

An intelligent control mechanism may also be used to control and reduce carbon corrosion at the cooling periods of a fuel cell stack from prior operation during a stop mode or a stop-start mode of the fuel cell vehicle. A vehicle comprising a fuel cell stack arranged to generate power for propelling the vehicle is provided. The automotive fuel cell stack may comprise anodes, cathodes, and a controller programmed to, upon receiving data indicating that a load current demand is within a first pre-determined range, modulate a flow rate of air to the cathodes between zero and a pre-determined value until a cell output voltage achieves a value falling within a second pre-determined range greater than zero. In some embodiments, the flow rate of air to the cathodes may alternate between zero flow and a maximum flow set value that is a function of the size of the fuel cell system in consideration. Modulating the flow rate of air to the cathodes may be achieved by speeding up or slowing down (actuating) one or more compressors/blowers (pumps) and/or opening and/or closing valves.

In some embodiments, the first pre-determined range of electrical current load demand corresponds to a current demand representative of a stop or a stop-start mode. In some embodiments, the flow rate of air to the cathodes between zero and a pre-determined value may continue until the cell output voltage achieves a cell voltage in the range of 0.2-0.3 volts (per cell) when the stack is at hot temperatures. In other embodiments, a ceiling value of the second pre-determined range may be 0.3 volts or less per cell. In yet other embodiments, depending on design requirements, the second predetermined range may be set to an acceptable maximum voltage threshold which would minimize performance degradation.

Figure 4:
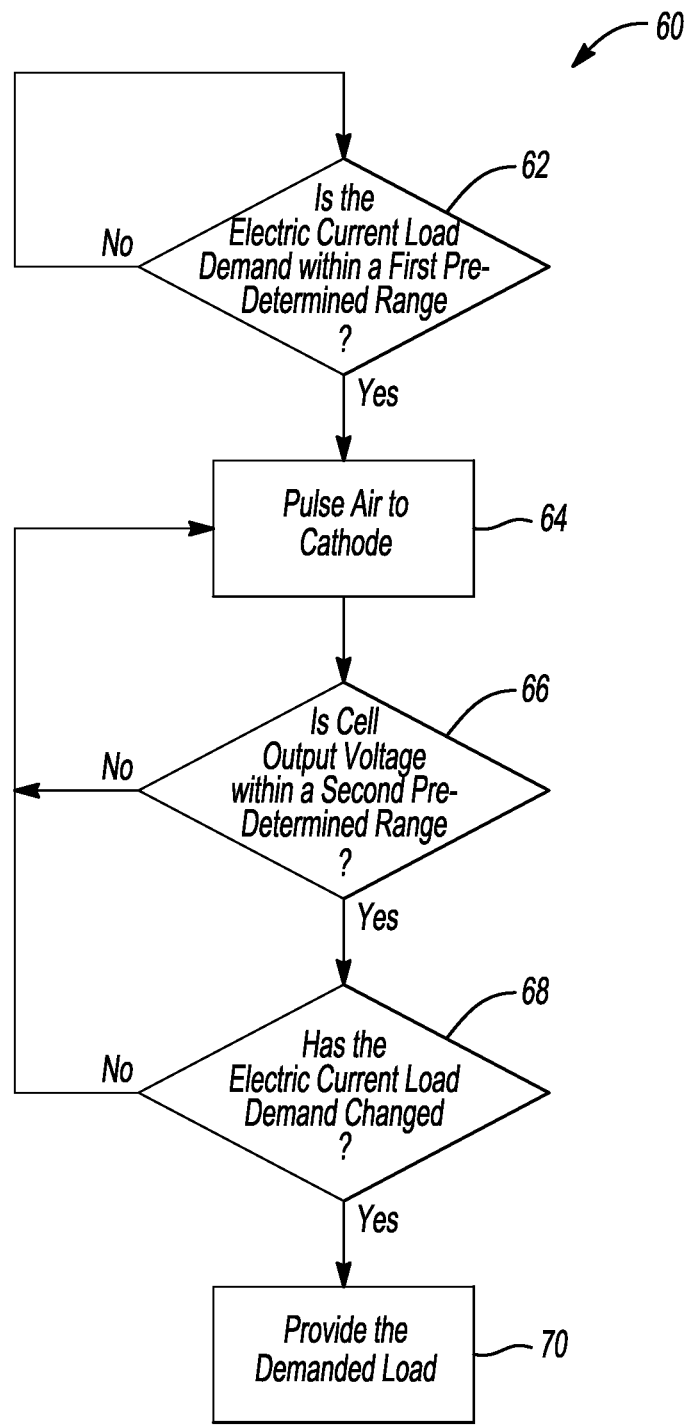
FIG. 4 demonstrates a flow chart of a control mechanism that may be used to control and reduce carbon corrosion at the cooling periods of a fuel cell stack from prior operation or during stop mode or stop-start fuel cell vehicle operations.

FIG. 4 demonstrates a flow chart of an intelligent control mechanism 60 which may be used to control and reduce carbon corrosion at the cooling periods of a fuel cell stack from prior operation during a stop mode or a stop-start mode of the fuel cell vehicle operations. During a first step 62, a controller determines whether an electric current load demand is within a first pre-determined range. If yes, the controller sends a signal during a second step 64 to cathodes to speed up or slow down one or more compressors/blowers (pumps) and/or open and/or close valves thereby modulating air flow to the fuel cell stack. If the cell output voltage is not within a second pre-determined range, during a third step 66, the second step 64 may be repeated. If the cell output voltage is within a second pre-determined range, during the third step 66, the controller maintains the cell output voltage, by repeating the second step 64 when needed, until the electric load demand changes based on a user's demand 70.

An intelligent control mechanism may also be used to control and reduce carbon corrosion at the end of a vehicle operation (key-off). In some embodiments, this control mechanism may only be needed for short periods of time (for example a few seconds). A vehicle comprising a fuel cell stack arranged to generate power for propelling the vehicle is provided. The vehicle may further include a controller programmed to, upon de-activation of the vehicle, pulse delivery of air to cathodes of the fuel cell stack such that a flow rate of air to the cathodes alternates between zero and a pre-determined value until a cell output voltage achieves a value falling within a pre-determined range. In some embodiments, the flow rate of air to the cathodes may alternate between zero flow and a maximum flow set value that is a function of the size of the fuel cell system in consideration. In some embodiments, the flow rate of air to the cathodes between zero and a pre-determined value may continue until the cell output voltage achieves a cell voltage in the range of 0.2-0.3 volts or less per cell when the stack is at hot temperatures. In some embodiments, upon reaching a predetermined cell output voltage, delivery of air to the cathodes may be zero.

Figure 5:
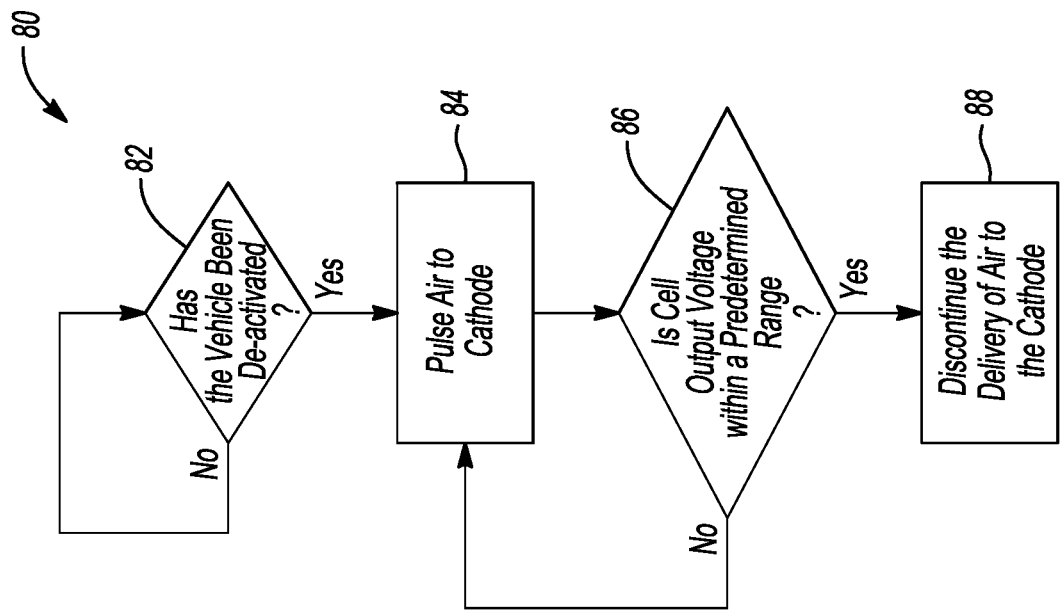
FIG. 5 demonstrates a flow chart of a control mechanism that may be used to control and reduce carbon corrosion at the end of a vehicle operation.

FIG. 5 demonstrates a flow chart of an intelligent control mechanism 80 which may be used to control and reduce carbon corrosion at the end of a vehicle operation. During a first step 82, a controller determines whether a vehicle has been de-activated. If the vehicle has been de-activated, the controller sends a signal during a second step 84 to cathodes to speed up or slow down one or more compressors/blowers (pumps) and/or open and/or close valves thereby modulating air flow to a fuel cell stack. If a cell output voltage is within a pre-determined range during a third step 86, the controller may discontinue the delivery of air to the cathode in a fourth step 88. If the cell output voltage is not within the pre-determined range, the second step 84 may be repeated.

In some embodiments of the present disclosure, a method for a vehicle, having a fuel cell stack for power generation is provided. The method comprises modulating between zero and a predetermined value a flow rate of air to cathodes of the fuel cell stack, after activating the vehicle, until cell output voltage achieves a value falling within a pre-determined range. In some embodiments, after the cell output voltage achieves the value falling within the pre-determined range, the method provides for continually delivering air to the cathodes at a non-zero rate. In some embodiments, the flow rate of air to the cathodes may alternate between zero flow and maximum flow set value that is a function of the size of the fuel cell system in consideration. In some embodiments, a ceiling value of the pre-determined range of the cell output voltage may be 0.85 volts or less per cell. Depending on design requirements, the cell voltage range may be set to an acceptable maximum voltage threshold which would minimize performance degradation.

In some embodiments of the present disclosure, a method for a vehicle, having a fuel cell stack for power generation is provided. The method comprises upon receiving data indicating an electrical current load demand falling within a first pre-determined range via a controller, modulating between zero and a predetermined value a flow rate of air to cathodes of the fuel cell stack until a cell output voltage achieves a value falling within a second pre-determined range greater than zero. In some embodiments, the first predetermined range of electrical current load demand corresponds to a current demand representative of a stop or a stop-start mode. In some embodiments, the flow rate of air may modulate between zero flow and maximum flow set value that is a function of the size of the fuel cell system in consideration. In some embodiments, the modulating of air to the cathodes between zero and a pre-determined value may continue until the cell output voltage achieves a cell voltage in the range of 0.2-0.3 volts (per cell) when the stack is at hot temperatures. In some embodiments, a ceiling value of the second pre-determined range is 0.3 volts or less per cell. In some embodiments, the modulating of air to the cathodes between zero and a pre-determined value may continue until data is received indicating a change in demand load, in order to maintain the value falling within the second pre-determined range. Depending on design requirements, the cell voltage range may be set to an acceptable maximum voltage threshold which would minimize performance degradation.

In some embodiments of the present disclosure, a method for a vehicle, having a fuel cell stack for power generation is provided. The method comprises modulating between zero and a predetermined value a flow rate of air to cathodes of the fuel cell stack, after deactivating the vehicle, until cell output voltage achieves a value falling within a pre-determined range. In some embodiments, after the cell output voltage achieves the value falling within the pre-determined range, the method provides for substantially stopping the delivery of air to the cathodes. In some embodiments, the flow rate of air to the cathodes may alternate between zero flow and a maximum flow set value that is a function of the size of the fuel cell system in consideration. The modulating of the flow rate of air to the cathodes may be achieved by speeding up or slowing down (actuating) one or more compressors/blowers (pumps) and/or opening and/or closing valves. In some embodiments, the flow rate of air to the cathodes between zero and a pre-determined value may continue until the cell output voltage achieves a cell voltage in the range of 0.2-0.3 volts or less per cell when the stack is at hot temperatures. In some embodiments, the cell output voltage has a ceiling value of 0.3 volts per cell. In some embodiments, modulating the flow rate of air to the cathodes continues until the fuel cell stack is substantially free of anode gas.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics, are not outside the scope of the disclosure and can be desirable for particular applications.

What is claimed is:

1. A vehicle comprising:
   a fuel cell stack arranged to generate power for propelling the vehicle; and
   a controller programmed to, upon activation of the vehicle,
      pulse delivery of air to cathodes of the fuel cell stack such that a flow rate of air to the cathodes alternates between zero and a pre-determined value until a cell output voltage achieves a value falling within a pre-determined range, and
      after the cell output voltage achieves the value falling within the pre-determined range, continually deliver air to the cathodes at a non-zero rate.

2. The vehicle of claim 1, wherein the controller is further programmed to begin delivering anode gas to anodes of the fuel cell stack before the pulse delivery.

3. The vehicle of claim 2, wherein the anode gas is hydrogen.

4. The vehicle of claim 1, wherein the pulse delivery of air to the cathodes continues until the controller receives a sensed input indicating an electrical current load demand exceeding the pre-determined range.

5. The vehicle of claim 1, wherein a ceiling value of the pre-determined range is 0.85 volts or less per cell.

6. The vehicle of claim 1, wherein the pre-determined value is a maximum value.

7. The vehicle of claim 1 further comprising a pump or valve, wherein the pulse delivery of air to cathodes includes actuating the pump or valve.

8. An automotive fuel cell stack comprising:
   anodes and cathodes; and
   a controller programmed to, after receiving data indicating that load current demand is within a first pre-determined range, modulate a flow rate of air to the cathodes between zero and a pre-determined value until a cell output voltage achieves a value falling within a second pre-determined range greater than zero.

9. The automotive fuel cell stack of claim 8, wherein the pre-determined value is a maximum value.

10. The automotive fuel cell stack of claim 8 further comprising at least one of a compressor, a blower, or a valve, wherein the modulating includes speeding up or slowing down the compressor or the blower or opening or closing the valve.

11. The automotive fuel cell stack of claim 8, wherein the first pre-determined range is indicative of a stop mode or a stop-start mode.

12. The automotive fuel cell stack of claim 8, wherein a ceiling value of the second pre-determined range is 0.3 volts or less per cell.

13. The automotive fuel cell stack of claim 8, wherein the modulating continues until the controller receives a sensed input indicating an electrical current load demand has exceeded the first pre-determined range.

14. A method for a vehicle, having a fuel cell stack for power generation, comprising:
   after deactivating the vehicle, modulating between zero and a pre-determined value a flow rate of air to cathodes of the fuel cell stack until cell output voltage of the fuel cell stack achieves a value falling within a pre-determined range.

15. The method of claim 14, wherein the pre-determined value is a maximum value.

16. The method of claim 14, wherein the modulating is achieved by speeding up or slowing down a compressor or a blower or opening or closing a valve.

17. The method of claim 14, wherein a ceiling value of the pre-determined range is 0.3 volts per cell.

18. The method of claim 14, wherein the modulating continues until the fuel cell stack is substantially free of anode gas.

* * * * *